United States Patent
Chigurupati

(10) Patent No.: US 10,826,978 B1
(45) Date of Patent: Nov. 3, 2020

(54) SYSTEMS AND METHODS FOR SERVER LOAD CONTROL

(71) Applicant: CA, INC., San Jose, CA (US)

(72) Inventor: Chakravarthi Srinivasa Chigurupati, Palo Alto, CA (US)

(73) Assignee: CA, Inc., San Jose, CA (US)

( * ) Notice: Subject to any disclaimer, the term of this patent is extended or adjusted under 35 U.S.C. 154(b) by 367 days.

(21) Appl. No.: 15/988,583

(22) Filed: May 24, 2018

(51) Int. Cl.
*H04L 29/08* (2006.01)

(52) U.S. Cl.
CPC .......... *H04L 67/1002* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 8,750,213 B2 * | 6/2014 | Jang | H04W 76/18 370/328 |
| 10,594,805 B2 * | 3/2020 | Smith | H04L 12/2812 |

* cited by examiner

*Primary Examiner* — William G Trost, IV
*Assistant Examiner* — Angela Nguyen
(74) *Attorney, Agent, or Firm* — FisherBroyles, LLP

(57) ABSTRACT

A computer-implemented method for server load control may include: (a) receiving a request of a first type or a second type; (b) transmitting a response of a form that will not be processed by the second computer, thereby reducing the load on a third computer, when the request is of the first type, and that will be processed by the second computer when the request is of the second type; and (c) when the request is of the second type and the response is processed by the second computer, receiving a message from the second computer that results from the processed response and indicates that the request is not of the first type. Various other methods, systems, and computer-readable media are also disclosed.

19 Claims, 9 Drawing Sheets

SYSTEMS AND METHODS FOR SERVER LOAD CONTROL

BACKGROUND

A cloud access security broker (CASB) is a software tool or service that acts as a gateway between an organization's computers and servers and a cloud provider's servers. A CASB may act as a gatekeeper, allowing the organization to extend the reach of its security policies beyond its own infrastructure. For example, CASBs may be used to ensure that network traffic between an organization's devices and a cloud provider complies with the organization's security policies. CASB services may be used to monitor cloud application use across multiple cloud platforms and to identify unsanctioned use. CASBs also may identify cloud applications in use and identify high-risk applications, high-risk users, and other key risk factors. CASBs may enforce security access controls such as encryption and device profiling, and also may provide other services such as credential mapping when single sign-on is not available. Finally, CASBs may collect data that can be used for reasons other than security, such as monitoring cloud service usage for budgeting purposes.

Many organizations use CASB gateways for monitoring of cloud service products such as Office365, G Suite, Box, Dropbox, etc. The CASB gateways may sit in the cloud and thus be unable to rely on techniques such as accessing an on-premises AD (Active Directory) for determining a user's identity. When incoming traffic from a user doesn't carry any user identification, the user's browser may be redirected to the CASB's portal, and the user may be challenged to identify himself with a login before the CASB will permit the user to access the requested cloud service.

As explained in further detail below, the instant disclosure describes embodiments of systems and methods that address problems that may arise in connection with CASBs that are part of a single sign-on (SSO) system that comprises Identity Provider (IDP) servers, and describes related server load control systems and methods.

SUMMARY

As will be described in greater detail below, the instant disclosure describes various systems and methods for server load control.

In one example, a computer-implemented method for server load control may include: (a) receiving a request of a first type or a second type; (b) transmitting a response of a form that will not be processed by the second computer when the request is of the first type, and that will be processed by the second computer when the request is of the second type; and (c) when the request is of the second type and the response is processed by the second computer, receiving a message from the second computer that results from the processed response and indicates that the request is not of the first type.

In at least one embodiment, the first type of request may be an AJAX request, and the second type of request may be a non-AJAX request. In an embodiment, the method may further include, after receiving the message, redirecting a browser running on the second computer to an identity provider server. In other embodiments, the response may include a web page to be loaded by a browser running on the second computer when the request is of the second type, and that will not be loaded by the browser when the request is of the first type. In a further embodiment, when the web page is loaded by the browser of the second computer, the loaded web page runs JavaScript that sends the message. In at least one embodiment, the message may include data from the request.

In further embodiments, the first type of request may be an asynchronous request, and the second type of request may be a synchronous request. In at least one embodiment, the first computer may be a cloud access security broker server. In another embodiment, the first computer may be a server within a Security Assertion Markup Language identity verification system.

In one embodiment, a system for server load control may include several modules stored in memory, including a communication module that may: (a) receive from a second computer, via a computer network, a request of a first type or a second type; (b) transmit, to the second computer via the computer network, a response to the request that is of a form that will not be processed by the second computer when the request is of the first type, and that will be processed by the second computer when the request is of the second type; and (c) when the request is of the second type and the response is processed by the second computer, receives a message from the second computer, via the computer network, wherein the message results from the processed response and indicates that the request is not of the first type.

In one embodiment, the first type of request may be an AJAX request, and the second type of request may be a non-AJAX request. In a further embodiment, after receiving the message the communication module may redirect a browser running on the second computer to an identity provider server. In at least one embodiment, the response may include a web page that may be loaded by a browser running on the second computer when the request is of the second type, and that will not be loaded by the browser when the request is of the first type. In a further embodiment, when the web page is loaded by the browser of the second computing device, the loaded web page may run JavaScript that sends the message to the communication module. In an embodiment, the first type of request may be an asynchronous request, and the second type of request may be a synchronous request. In another embodiment, the first computer may be a cloud access security broker server. In a further embodiment, the first computer may be a server within a Security Assertion Markup Language identity verification system, and may include a server module that generates the web page and JavaScript.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to: (a) receive a request of a first type or a second type; (b) transmit a response of a form that will not be processed by the second computer when the request is of the first type, and that will be processed by the second computer when the request is of the second type; and (c) when the request is of the second type and the response is processed by the second computer, receive a message from the second computer that results from the processed response and indicates that the request is not of the first type.

References throughout this specification to "one embodiment," "this embodiment," and similar phrases are intended to convey that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate selected example embodiments and are a part of the specification. Together with the following description, these drawings demonstrate and explain various principles of the instant disclosure.

Figure 1:
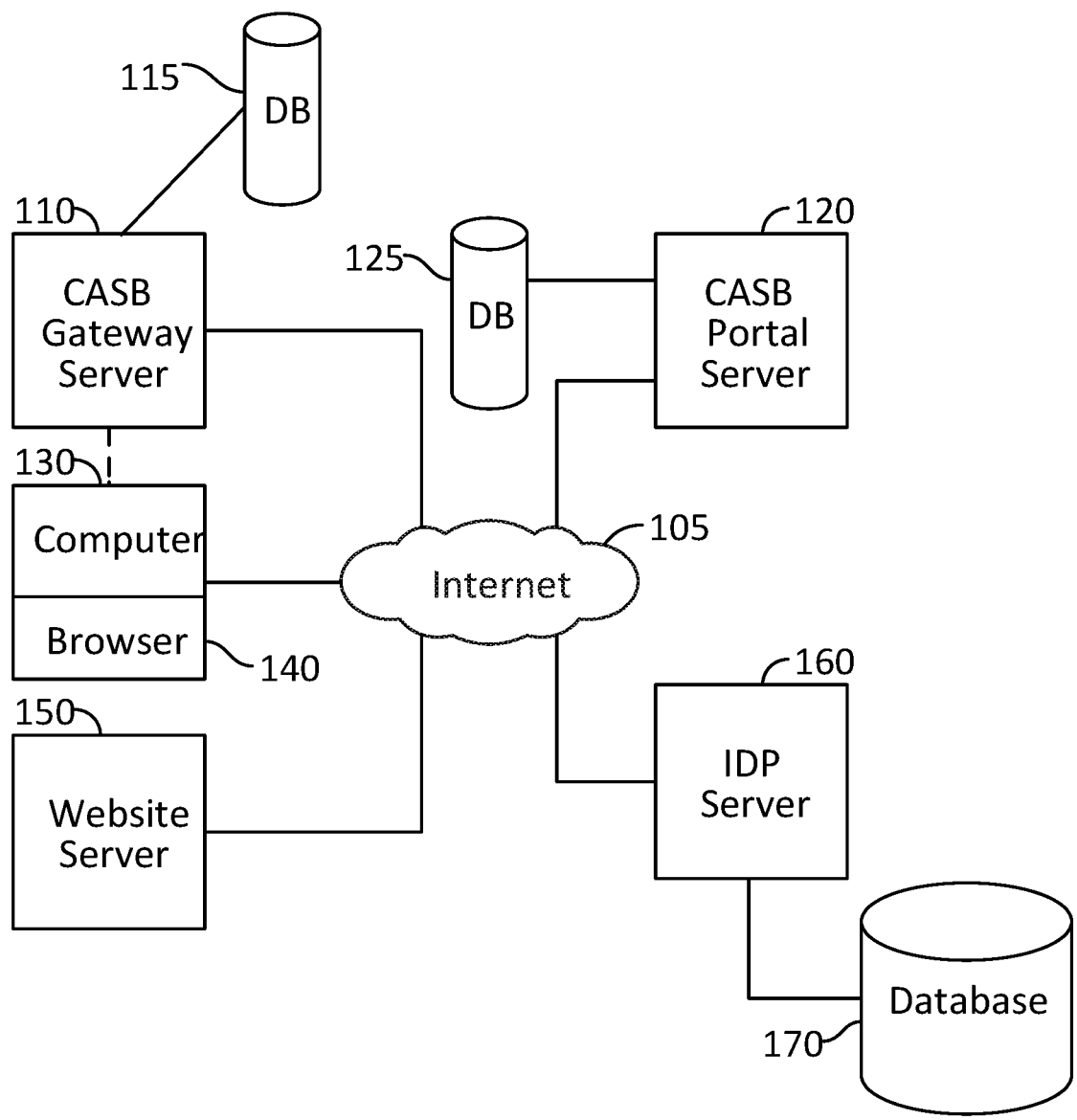
FIG. 1 is a block diagram of an example computing network comprising one or more components capable of implementing one or more of the embodiments described and/or illustrated herein.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for server load control. In particular, one or more embodiments control data loads transmitted to one or more servers, such as, for example, Identity Provider (IDP) servers in an SSO network environment.

Authorization and authentication between a browser and a cloud service provider may be performed via a Security Assertion Markup Language (SAML) process. SAML is an XML (Extensible Markup Language) based open standard data format for exchanging authorization and authentication data between an identity provider (IDP) and a service provider (SP). Generally, the SAML specification defines three roles: the user, the IDP, and the SP. The user requests a service from the SP, then the SP requests and obtains an identity assertion from the IDP. On the basis of this assertion, the SP can make an access control decision—i.e., the SP can decide whether to perform some service for the connected user. Before delivering the identity assertion to the SP, the IDP may request certain information from the user in order to authenticate the user, such as a user name and a password. The SAML protocol specifies the assertions (messages that assert identity) that are passed from the IDP to the SP. In SAML, one IDP may provide SAML assertions to many SPs. Conversely, one SP may rely on and trust assertions from many independent IDPs.

Some companies integrate their CASB service with an SSO (Single Sign-On) IDP. In such cases, users are not challenged with a login screen by a CASB gateway (via CASB Portal), but instead are redirected to an IDP using, for example, the SAML protocol. While the CASB gateway would typically not have the user's identifying information, the fact that the user belongs to an organization may be determined from the source IP of the incoming traffic.

A CASB may support the SAML protocol for SSO and act as an SP. In such cases, the SAML protocol relies on the browser to act as a trusted middle-man for redirections from the SP to the IDP, and back to the SP, using preconfigured certifications to sign the requests and responses. See FIG. 2, discussed in more detail below.

In cases in which an SSO IDP and SAML are used, users may visit consumer sites that try to probe (in the background, as often as once per minute) in order to determine whether the user is already logged into a cloud service. For example, a G Suite user who hasn't yet logged into a G Suite account in the foreground might access other consumer google sites (such as www.google.com, support.google.com). In another example, a G Suite user might use G Suite on one browser but use a different browser (or an incognito window) to access other consumer google sites such as google.com. In each of these examples, the consumer site may try to probe whether the G Suite user is already logged in to a G Suite account.

Often, such probes are AJAX (Asynchronous JavaScript and XML) requests initiated by JavaScript loaded into the user's browser from the consumer site. AJAX is a client-side technique for communication with a web server, and allows a browser to fetch data in the background without having to reload a whole page. In a typical (non-AJAX) web request, a browser sends a URL request to a server and the server responds with the corresponding HTML (HyperText Markup Language), CSS (Cascading Style Sheets), and JavaScript that generates a full new page in the browser. In contrast, in a typical AJAX request, the HTML, CSS, and JavaScript is already loaded, so instead of making a URL request for another whole page, the browser runs JavaScript that communicates to the server and receives smaller pieces of information that can range from HTML to other data formats like JSON (JavaScript Object Notation) and XML. The JavaScript then acts on the response and updates the page accordingly, without having to refresh the entire page. At a high level, an AJAX request consists of the URL to which the request is directed and corresponding settings to handle the response.

When a browser is using AJAX, the page is loaded entirely only once (the first time it is requested). Besides the HTML and CSS code that make up the page, some JavaScript files (the AJAX "engine") are also downloaded. All requests for data to the server will then be sent as JavaScript calls to this engine. The AJAX engine then requests information from the web server asynchronously. Thus, only small page bits are requested and sent to the browser, as they are needed by the user. The engine then displays the information without reloading the entire page. This leads to a much more responsive interface, because only the necessary information is passed between the client and server, not the whole page.

In the "probe" situations described above, an SAML-SSO-IDP process may fail to complete, since in the context of an AJAX request, the browser may execute HTTP (Hypertext Transfer Protocol) redirections, but may not execute an HTTP POST that an IDP would typically use to convey an SAML response to an SP.

Thus, such AJAX requests in an SAML context may cause an IDP to receive a flood of authentication requests, since the IDP's response in each case would not be acted upon by the browser (since the response comes in as an HTTP POST, which would not be recognized by the JavaScript that sent the AJAX request). For each such AJAX request, the SAML transaction is not completed (fails) and therefore the AJAX request is likely to be sent again and again by the corresponding JavaScript. The result is that there is a severe and unnecessary load on the IDP server(s) (as well as on the CASB—see FIG. 1).

As explained above, many users visit consumer sites that may frequently probe in the background (e.g., once per minute) to determine whether the user is already logged into popular services such as Google. These probes may be AJAX requests initiated by JavaScript loaded from those consumer sites. In the context of an AJAX request, the browser honors HTTP (Hypertext Transfer Protocol) redirections, but not HTTP POSTs such as those that an IDP may use to convey a SAML response to an SP.

Thus, the IDP server may receive frequent authentication requests corresponding to those AJAX requests, but the IDP server's responses will not be acted upon by the browser sending the AJAX requests since those responses are HTTP POSTs. The SAML process is therefore not completed, and the AJAX request is dropped, resulting in further AJAX requests being sent to the IDP server. The result is that there is severe load on the IDP server(s).

One or more embodiments described herein reduce the above-described load on IDP servers, and thus improve the functionality and increase the efficiency of SSO network systems. As will be seen from the description below, other embodiments may be used in non-SAML contexts, and provide analogous load control improvements for servers, networks, and network components.

Figure 5:
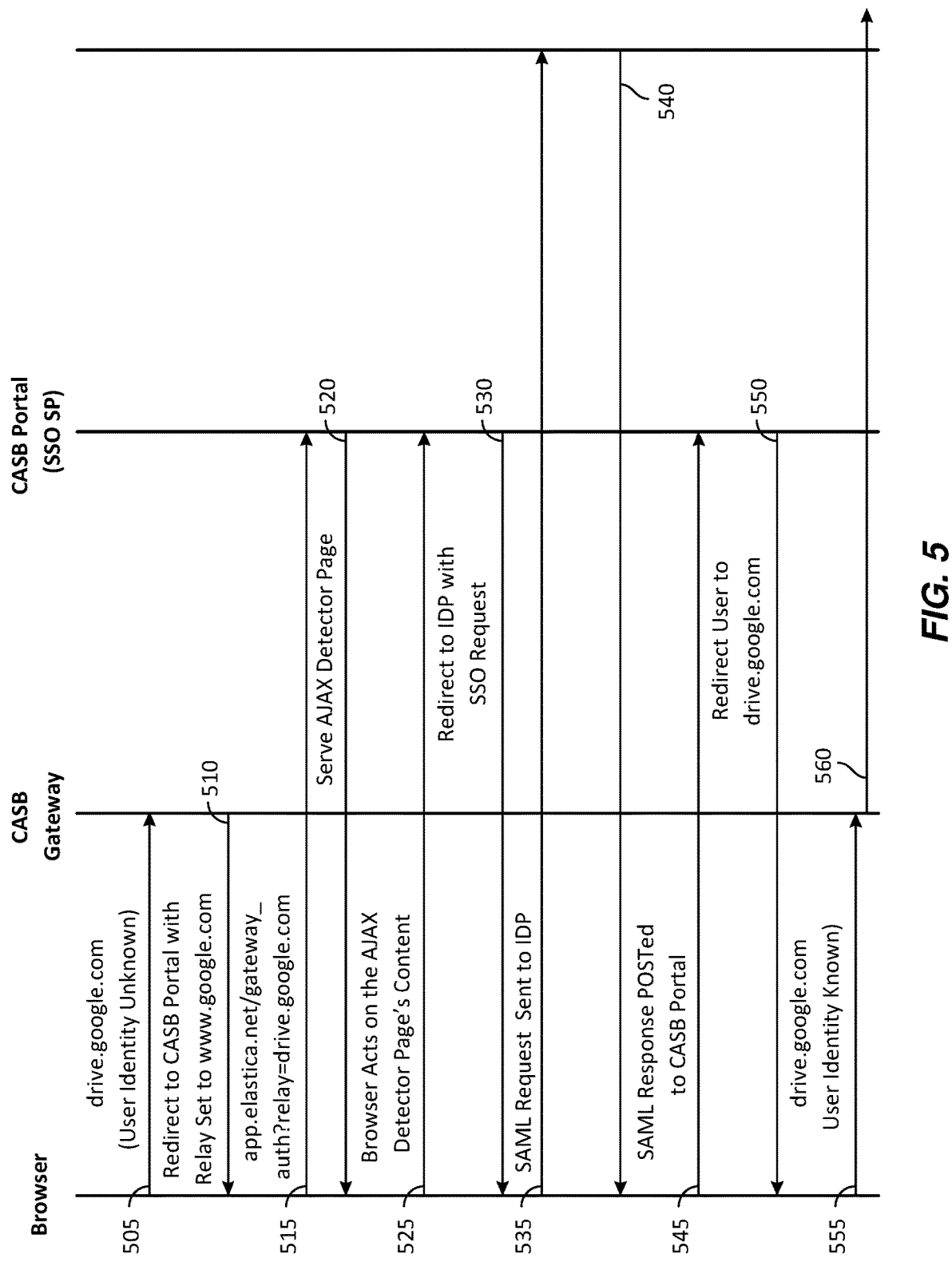
FIG. 5 is a flow diagram depicting an example of a typical message flow that includes a solution provided by an embodiment.
Figure 6:
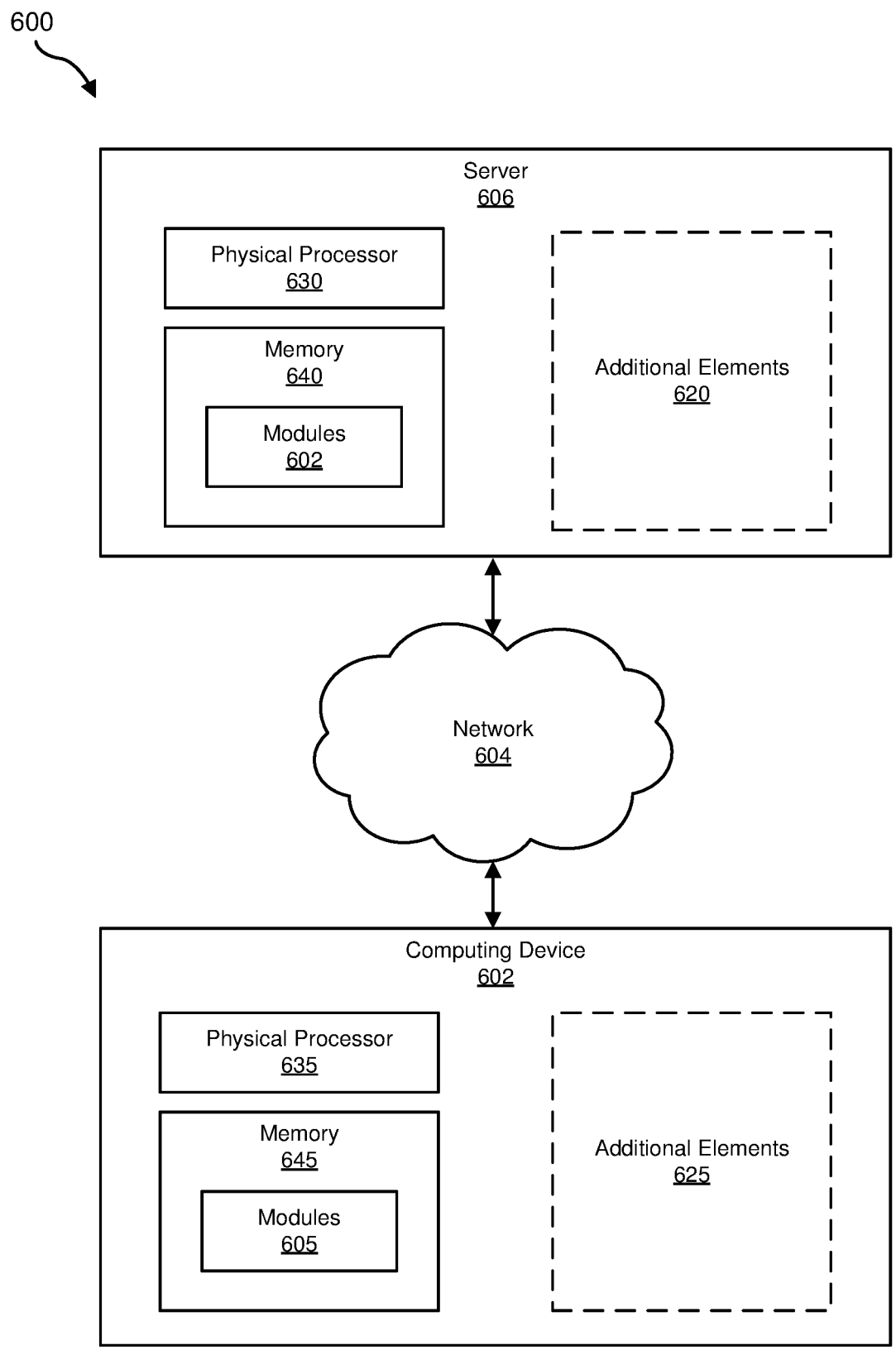
FIG. 6 is a component diagram of an example system comprising an embodiment.

The following will provide, with reference to FIGS. 1 and 6, detailed descriptions of example systems for server load control. Detailed descriptions of corresponding computer-implemented methods will be provided in connection with FIGS. 2-5 and 7.

FIG. 1 is a block diagram of an example computer/server/network system related to an embodiment. As illustrated in FIG. 1, a user computer 130 may run a browser application 140.

User Computer 130 may be connected to Internet 105, either directly or via CASB Gateway Server 110. User Computer 130 may be connected (either directly or via another network) to CASB Gateway Server 110. User Computer 130 also may be capable of communicating via Internet 105 with CASB Gateway Server 110, CASB Portal Server 120, IDP Server 160, and/or Website Server 150.

CASB Gateway Server 110 also may be connected to Internet 105, and may be connected (either directly or via another network) to user Computer 130 and/or to CASB Portal Server 120. CASB Gateway Server 110 may also be connected to database 115, which may store, for example, data regarding client organizations, users, cloud service providers, etc.

Similarly, CASB Portal Server 120 may be connected to Internet 105, and may be connected (either directly or via another network) to CASB Gateway Server 110. CASB Portal Server 120 also may be connected to a database 125, which may store, for example, IDP-related information.

IDP Server 160 may be connected to Internet 105, and may be connected to a database 170, which may store, for example, information regarding user accounts and identification.

Website Server 150 may be connected to Internet 105 and may be a server for an SaaS or other cloud based service website.

Figure 2:
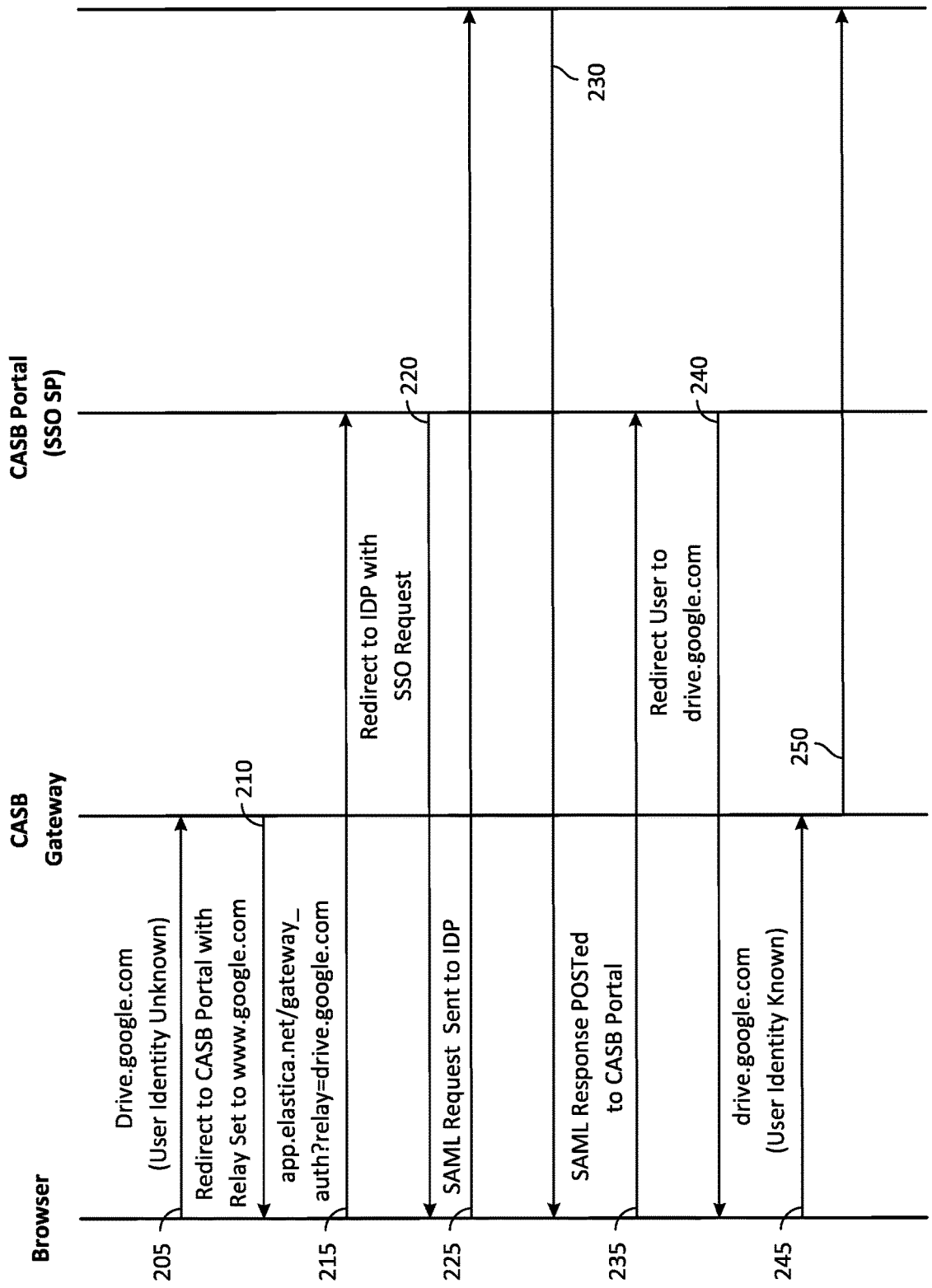
FIG. 2 is a flow diagram depicting a typical message flow that may occur in connection with an embodiment.

FIG. 2 depicts an example of typical communication flow wherein a user whose Internet access is monitored by a CASB attempts to access a cloud service such as drive.google.com. In this example, the request is initiated in the foreground by the user, and not in the background by an AJAX request.

In step 205, the user may attempt to access drive.google.com by typing that address into the address bar of Browser 140. Cloud traffic (that is, Internet traffic related to cloud services such as SaaS) for the user's organization may be diverted to CASB Gateway Server 110. At this step, the identity of the user typically is not known to the CASB Gateway (the source IP may identify the organization but not the user).

In step 210, CASB Gateway Server 110 may redirect Browser 140 (via a 302 redirect response) to CASB Portal Server 120. The redirect in this example may have the form: "app.elastica.net/gateway_auth?relay=drive.google.com", although any suitable message format may be used. Here, the original destination of the user (drive.google.com) is captured in the URL parameter "relay". Once the user's identity is determined, the relay parameter allows the CASB to redirect the user to the original destination (drive.google.com).

In step 215, Browser 140 may act on the 302 redirect to CASB Portal Server 120 and attempts to exercise the CASB Portal's user authentication procedures. In this example, CASB Portal Server 120 sees a tenant_id parameter in the request and determines that the tenant (organization) has SSO configured. If SSO is not configured for that tenant, then the user may be presented with a standard username/password dialog, but that case is not relevant to this description.

Since SSO is configured, in step 220 CASB Portal Server 120 may redirect the user to SSO IDP Server 160 via Browser 140 by sending a 302 redirect response to Browser 140 with the URL for IDP Server 160 as the destination. A SAML request also may be attached to the 302 redirect as payload. The SAML request may be an HTTP GET redirect or an HTTP POST redirect, depending on how SSO is configured between the tenant's IDP and the CASB Portal (acting as SSO SP).

In step 225, Browser 140 may act on the 302 redirect to SSO IDP Server 160. The IDP may use its usual procedures for determining user identity. For example, if the user is not already logged in, IDP Server 160 may present a login window.

In step 230, after successful user authentication, IDP Server 160 may send a SAML response, through Browser 140, toward CASB Portal (SP) Server 120. This may be achieved by serving a page that contains JavaScript, with the page configured to load the JavaScript automatically.

In step 235, the JavaScript in turn posts the SAML assertion (i.e., an XML document containing information about the user's identity and the IDP's signature) toward CASB Portal Server 120.

In step 240, CASB Portal Server 120 may process the SAML assertion, learn the user's identity, create a session for the user, propagate the user's identity to the CASB Gateway's backend, embed the user identity as a cookie, and/or issue a redirect toward the original destination (drive.google.com).

In step 245, Browser 140 may attempt to access the original destination (drive.google.com) but this time with the user's identity in the request. In step 250, the CASB Gateway Server 110 may intercept the request, find the user's identity, confirm from its backend that the user has a valid session with the CASB, and allow the Brower 140 to continue toward drive.google.com (i.e., Website Server 150).

The system and steps depicted in FIGS. 1-2 are part of a normal SAML/SSO system and process. However, certain problems arise when the events depicted in FIG. 3 (see below) occur. As noted above, a SAML sequence of steps (such as that depicted in FIG. 2) that is initiated in the context of an AJAX request often will not complete, because the user's browser (which initiated the request) will only honor redirections in the context of an AJAX request. In particular, the browser (i.e., the JavaScript that issued the AJAX request) will not load an HTML page and exercise the JavaScript on that page in the context of an AJAX request. This last step is crucial for the successful completion of a SAML SSO process because an HTML POST must be issued from the SSO IDP towards the CASB Portal acting as SSO SP.

Figure 3:
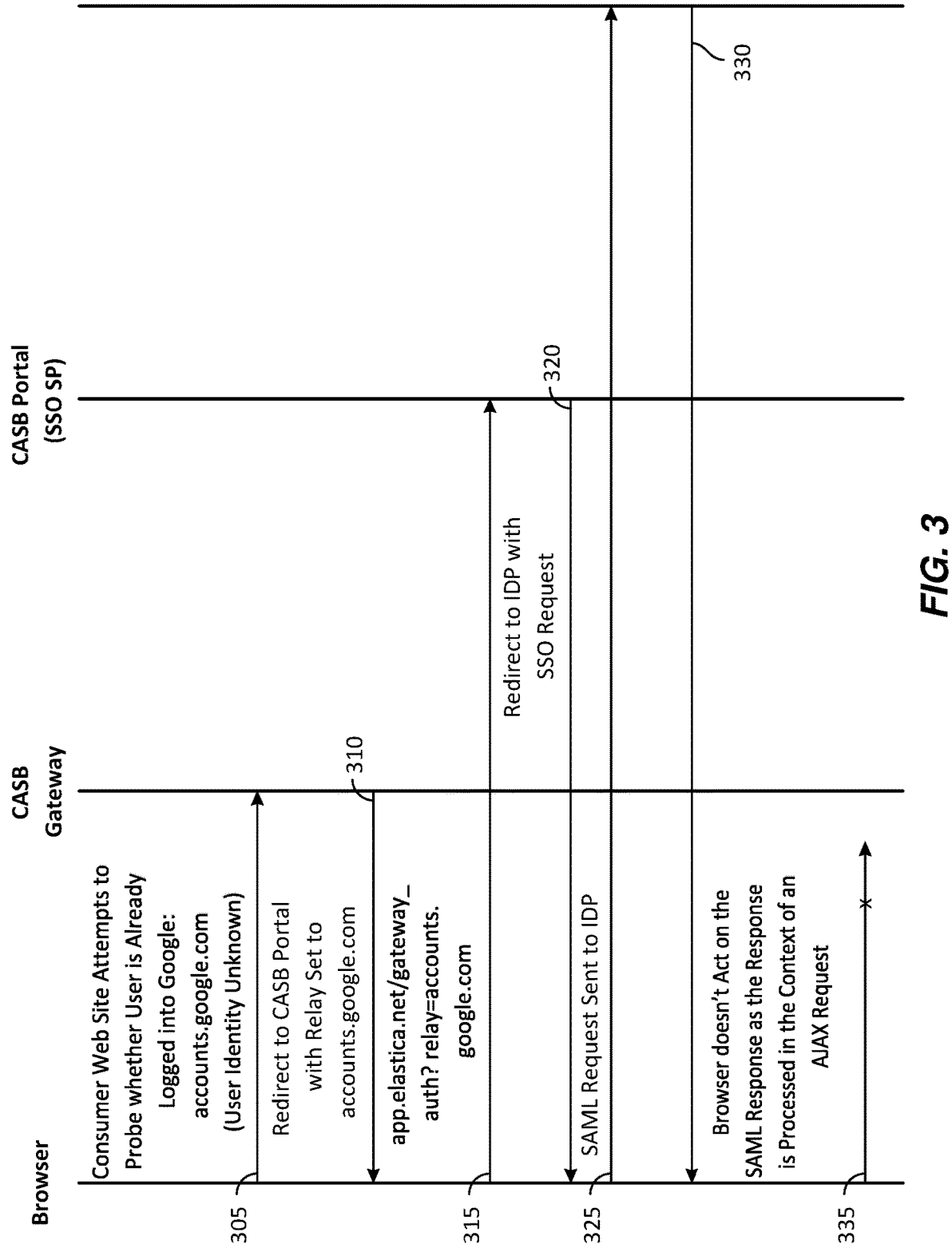
FIG. 3 is a flow diagram depicting an example of problematic message flow.

Turning to FIG. 3, at step 305 Browser 140 is on a consumer website and that website is probing in the background in order to determine whether the user is already logged into Google (accounts.google.com), for example. The probing is performed in order to determine the user's identity, and may be done via an AJAX request issued by the consumer website's JavaScript running on the user's Browser 140.

In step 310, CASB Gateway Server 110 may redirect Browser 140 (via a 302 redirect response) to CASB Portal Server 120. The redirect in this example may have the form: "app.elastica.net/gateway_auth?relay=accounts.google.com", although any suitable form of message may be used.

In step 315, Browser 140 may act on the 302 redirect to CASB Portal Server 120 and attempt to exercise the CASB Portal's user authentication procedures. CASB Portal Server 120 sees, for example, a tenant_id parameter in the request and determines that the tenant has SSO configured.

Since SSO is configured, in step 320 CASB Portal Server 120 may redirect the user to SSO IDP Server 160 via Browser 140 by sending a 302 response with the URL for IDP Server 160 as the destination. A SAML request also may be attached to this 302 redirect as payload. The SAML request may be an HTTP GET redirect or an HTTP POST redirect, depending on how SSO is configured between the tenant's IDP and the CASB Portal (acting as SSO SP).

In step 325, Browser 140 may act on the 302 to SSO IDP Server 160. The IDP may use its usual procedures for determining user identity. For example, if the user is not already logged in, IDP Server 160 may present a login window.

In step 330, after successful user authentication, IDP Server 160 may send a SAML response, through Browser 140, toward the CASB Portal (SP) Server 120. This may be achieved by serving a page that contains JavaScript, with the page configured to load the JavaScript automatically.

However, the response received from IDP Server 160 in step 330 is processed by Browser 140 using the "AJAX" JavaScript of the consumer site. This JavaScript is expecting a response from Google in a certain form, not a web page from the SAML IDP Server 160, and is unable to process the web page response. The response is therefore ignored, and the SAML SSO process fails and terminates.

After some time has passed (e.g., one minute), the consumer web site will start probing again. These repeated probes create a serious additional and undesired load on IDP Server 160.

Figure 4:
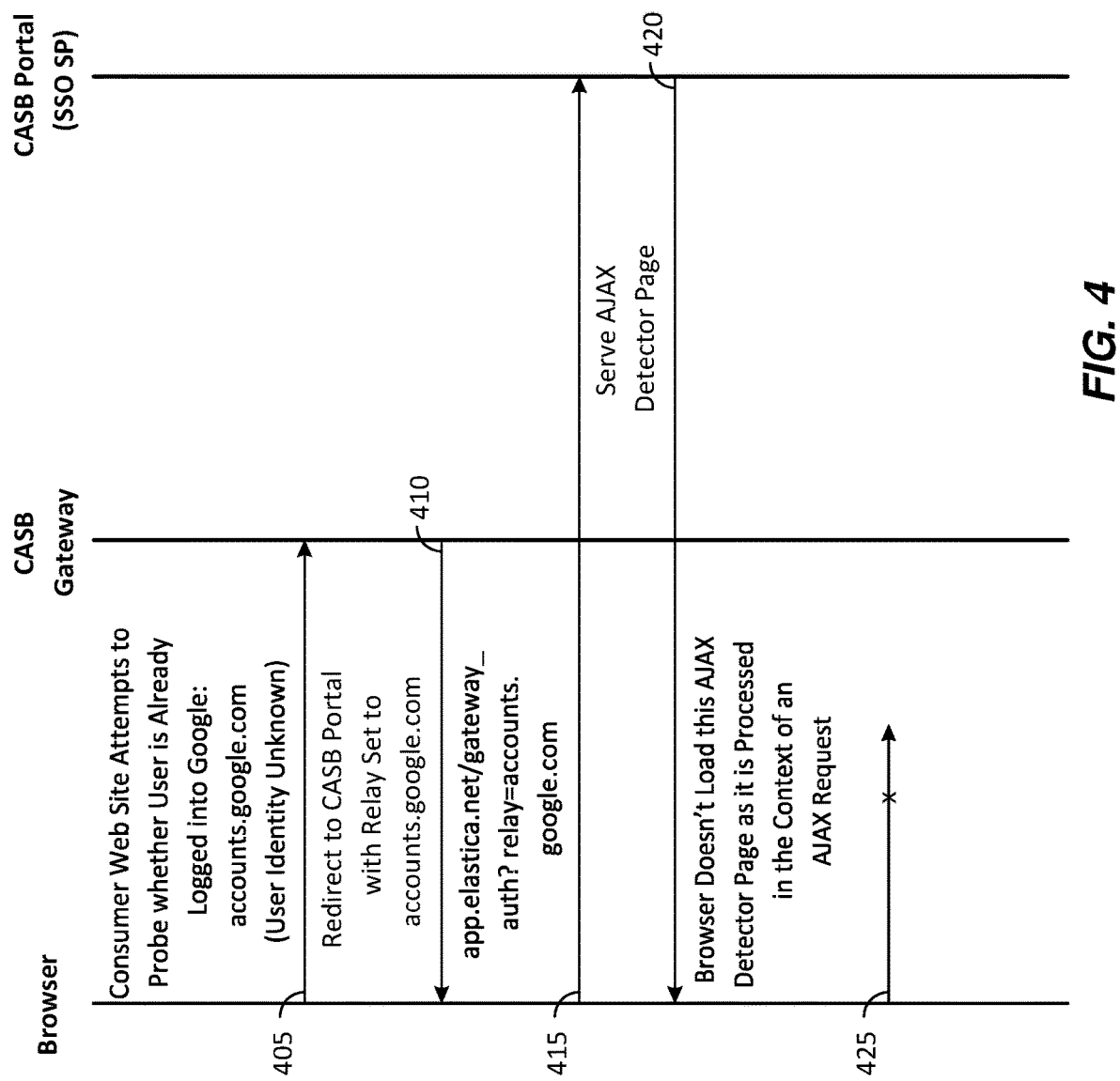
FIG. 4 is a flow diagram depicting an example of a solution provided by an embodiment.

FIG. 4 depicts an example embodiment that provides solution to the problem described above and depicted in FIG. 3.

As shown in FIG. 4, at step 405 Browser 140 may be connected to a consumer website (as in step 305 of FIG. 3), and that website may be probing in the background in order to determine whether the user is already logged into Google (accounts.google.com), for example. The probing may be done in order to determine the user's identity, and via an AJAX request issued by the consumer website's JavaScript running on Browser 140.

In step 410, since Browser 140 is now attempting to access a cloud based service, CASB Gateway Server 110 may redirect Browser 140 (via a 302 redirect response) to CASB Portal Server 120. The redirect in this example may have the form: "app.elastica.net/gateway_auth?relay=accounts.google.com", although any suitable form of message may be used.

In step 415, Browser 140 may act on the 302 redirect to CASB Portal Server 120 and attempt to exercise the CASB Portal's user authentication procedures. However, at step 420 CASB Portal Server 120 may serve an AJAX detector page (hosted by CASB Portal Server 120) instead of the usual SAML request toward the IDP. More details on this process are provided below with respect to FIG. 7.

At step 425, the response received from CASB Portal Server 120 in step 420 may be processed by Browser 140 using the JavaScript of the consumer site. Since this JavaScript is expecting a response from Google in a certain form, not a web page (the AJAX detector page) from the CASB Portal Server 120, it may be unable to process the web page response. The response may therefore be ignored, and the SAML SSO process may terminate before a SAML request is sent to IDP Server 160.

Thus, IDP Server 160 is spared from the flood of SAML requests that don't complete. CASB Gateway Server 110 and CASB Portal Server 120 may continue to receive that flood, but the CASB may not be required to initiate any SAML transactions or keep state about them.

FIG. 5 depicts much of the same type of flow as FIG. 2, but with the AJAX detection process of FIG. 4 now included. In this example, the request is again initiated in the foreground by the user, and not in the background by an AJAX request.

In step 505, the user may attempt to access drive.google.com. All cloud traffic tenant may be diverted to CASB Gateway Server 110.

In step 510, CASB Gateway Server 110 may redirect Browser 140 (via a 302 redirect response) to CASB Portal Server 120. The redirect in this example may again have the form: "app.elastica.net/ gateway_auth?relay=drive.google.com", although any suitable form of message may be used.

In step 515, Browser 140 may act on the 302 redirect to CASB Portal Server 120 and attempt to exercise the CASB Portal's user authentication procedures. In step 520, the CASB Portal Server 120 may serve an AJAX detector page instead of the usual SAML request towards the IDP.

At step 525, the AJAX detector page may be processed by Browser 140 using the JavaScript of the consumer website. Browser 140 may load this page since this is not in the context of an AJAX request. The AJAX detector page may be configured to run the embedded JavaScript automatically upon page load. This JavaScript may then make a call to CASB Portal Server 120 with the argument is_ajax_request=false. Thus, CASB Portal Server 120 may determine that the SAML process may proceed, and at step 530 may redirect Browser 140 to SSO IDP Server 160 by sending a 302 response/redirect with the URL for IDP Server 160 as the destination. A SAML request also may be attached to this 302 redirect as payload. The SAML request may be, for example, an HTTP GET redirect or an HTTP POST redirect, depending on how SSO is configured between the IDP and the CASB (acting as SSO SP).

In step 535, Browser 140 may act on the 302 to SSO IDP Server 160. The IDP may use its usual procedures for determining user identity. For example, if the user is not already logged in, IDP Server 160 may present a login window.

In step 540, after successful user authentication, IDP Server 160 may send a SAML response, through Browser 140, toward the CASB Portal (SP) Server 120. This may be achieved by serving a page that contains JavaScript, with the page configured to load the JavaScript automatically.

In step 545, that JavaScript may in turn post the SAML assertion (i.e., an XML document containing information about the user's identity and the IDP's signature) toward the CASB Portal Server 120.

In step 550, CASB Portal Server 120 may process the SAML assertion, learn the user's identity, create a session for the user, propagate the user's identity to the CASB Gateway's backend, embed the user identity as a cookie, and/or issue a redirect toward the original destination (drive.google.com).

In step 555, Browser 140 may send the user toward the original destination (drive.google.com), but this time with the user's identity in the request. In step 560, the CASB Gateway Server 110 may intercept the request, find the user's identity, confirm from its backend that the user has a valid session with the CASB, and allow the traffic to continue toward drive.google.com (i.e., Website Server 150).

FIG. 6 depicts an example server and an example computer in communication over a computer network. In certain embodiments, one or more of modules 660 and 665 in FIG. 6 may represent one or more software applications or programs that, when executed by a computing device (e.g., Server 606 and/or Computer 602), may cause the computing device to perform one or more tasks. In particular, one or more of modules 660 and 665 may comprise a communication module configured to receive and send messages over Network 604. One or more of modules 660, 665 in FIG. 6 may also represent all or portions of one or more special-purpose computers configured to perform one or more tasks.

As illustrated in FIG. 6, Server 606 and/or Computer 602 may also include one or more memory devices, such as memories 640 and 645. Memories 640, 645 generally represent any type or form of volatile or non-volatile storage device or medium capable of storing data and/or computer-readable instructions. In one example, memory 140 may store, load, and/or maintain one or more of modules 102. Examples of memories 640, 645 may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 6, Server 606 and/or Computer 602 may also include one or more physical processors, such as physical processors 630, 635. Physical processors 630, 635 generally represent any type or form of hardware-implemented processing unit capable of interpreting and/or executing computer-readable instructions. Examples of physical processors 630, 635 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

In one example, physical processors 630, 635 may access and/or modify one or more of modules 660, 665 stored in memories 640, 645, respectively. Additionally or alternatively, physical processors 630, 635 may execute one or more of modules 660, 665 to facilitate execution of one or more method embodiments described herein.

As illustrated in FIG. 6, Server 606 and/or Computer 602 may also include one or more additional elements 620, 625, such I/O components, network interfaces, and other types of suitable hardware.

Server 606 and Computer 602 in FIG. 6 may be implemented in a variety of ways. For example, either or both may represent portions of the example system depicted in FIG. 1.

Computer 602 generally represents any type or form of computing device capable of reading computer-executable instructions and communicating over a computer network. Examples of Computer 602 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 606 generally represents any type or form of computing device that is connected to a computer network and capable of server-type functionality. Examples of Server 606 include, without limitation, security servers, application servers, web servers, storage servers, and/or database servers configured to run certain software applications and/or provide various security, web, storage, and/or database services. Although illustrated as a single entity in FIG. 6, Server 606 may include and/or represent a plurality of servers that work and/or operate in conjunction with one another.

Network 604 generally represents any medium or architecture capable of facilitating communication or data transfer. In one example, Network 604 may facilitate communication between Computer 602 and Server 606. In this example, Network 604 may facilitate communication or data transfer using wireless and/or wired connections. Examples of Network 604 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Examples of Server 606 include CASB Gateway Server 110, CASB Portal Server 120, IDP Server 160, and Website server 150 depicted in FIG. 1. An example of Computer 602 is Computer 130 depicted in FIG. 1, and an example of Network 604 is Internet 105 depicted in FIG. 1.

Figure 7:
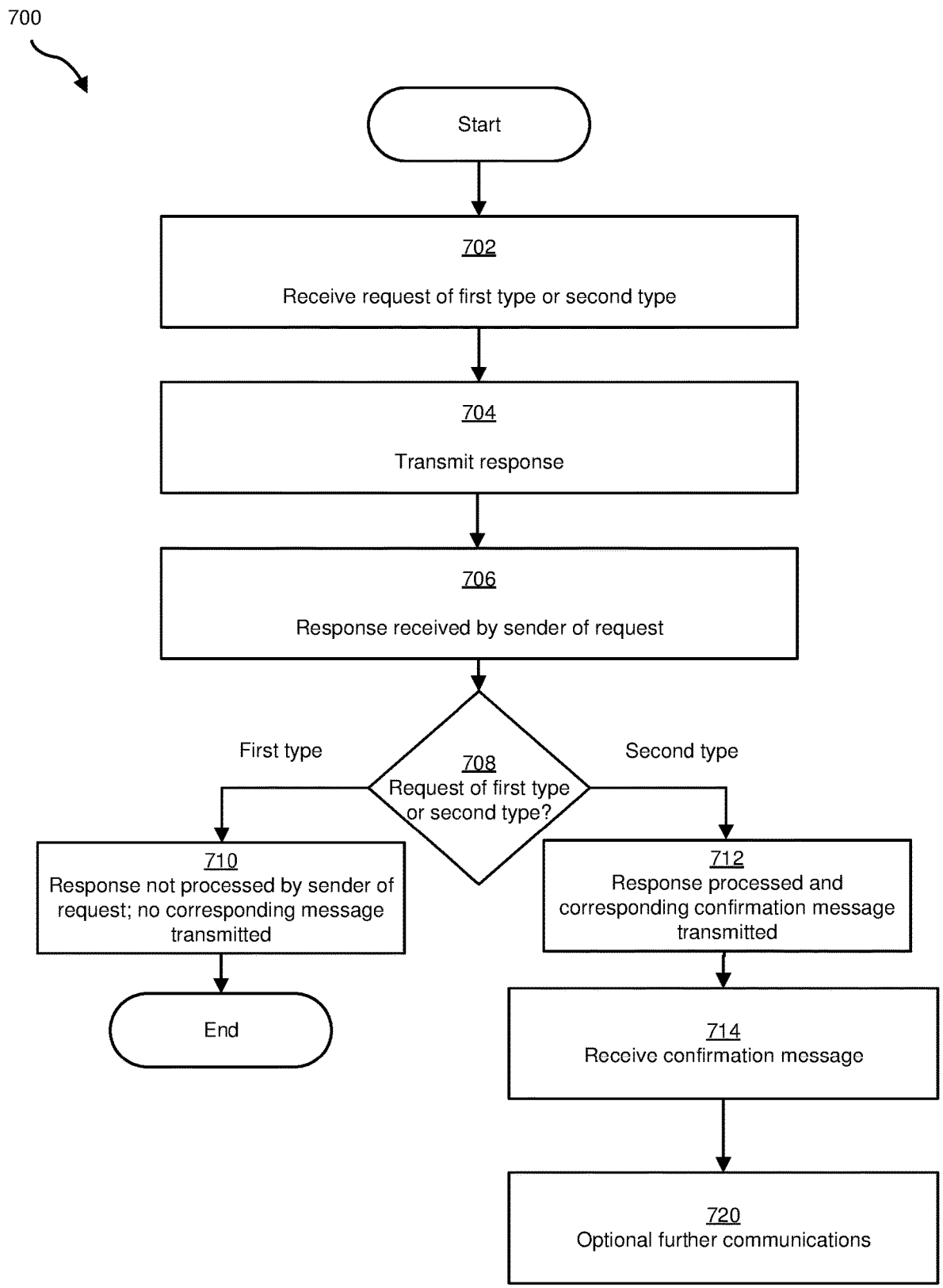
FIG. 7 is a flow diagram of an example computer-implemented method embodiment for server load control.

FIG. 7 is a flow diagram of an example computer-implemented method embodiment for server load control. The steps shown in FIG. 7 may be performed by any suitable computer-executable code and/or computing system, including a server such as Server 606 in FIG. 6, CASB Gateway Server 110 and/or Portal Server 120 in FIG. 1, any other suitable computing device, and/or variations or combinations of one or more of the same. In one example, each of the steps shown in FIG. 7 may represent multiple sub-steps, examples of which will be described in greater detail below.

As illustrated in FIG. 7, at step 702 one or more of the servers described herein may receive a request of a first type or of a second type. Examples of a first type of request include an AJAX request, and examples of a second type of request include a SAML request; however, as will be seen below, other examples may include any two types of requests that satisfy the conditions of steps 710 and 712. That is, any two types of requests wherein a response that will be responded to by a sender of the second type of request will not be responded to by a sender of the first type of request may be suitable first and second types of requests for this step.

The systems described herein may perform step 702 in a variety of ways. In one example, when a request of a first type is received, that request may be an AJAX request. Such requests may, for example, be sent by a user's browser from a computer (such as Computer 602) and contain a query to a cloud service to determine whether the user is logged in to that service. However, the request of the first type is not limited to AJAX requests, but as noted above in other embodiments may be any request that satisfies the condition of step 710.

In another example, when a request of a second type is received, that request may be a SAML request for authentication of a user, wherein the request is sent by a CASB or other gatekeeping system designed to control access by company employees to certain online sites or services (such as cloud services). In such cases, the SAML request may be intended to be redirected to an IDP server. The SAML request may have the form depicted in FIG. 1, or may have any other suitable form. Moreover, requests of the second type are not limited to SAML requests, but as noted above in other embodiments may be any request that satisfies the condition of step 712.

Returning to FIG. 7, at step 704 a response to the request may be transmitted to the sender of the request. In one example, the response may be a web page containing JavaScript that is executed when the web page is loaded. However, in other embodiments the response may have any form that satisfies the conditions of steps 710 and 712—i.e., that is responded to by the sender of the request when the request is of a second type, and not responded to by the sender of the request when the request is of the first type.

For example, step 704 may comprise checking a SAML request for the presence of a special argument called is_ajax_request=false in the request URL. If this argument is not present, then the response may redirect the computer (e.g., Browser 140) to an "AJAX detector" page rather than the SSO IDP. This detector page may carry JavaScript that is exercised immediately on page load. The original request, original_url_params, may be preserved as part of these redirections.

In step 706, the transmitted response may be received by the sender of the request. The sender may be any computing device described herein (e.g., Computer 602, or Server 606). In one example, the sender is a user computer running a browser. Decision point 708 illustrates how the process bifurcates, depending on the type of the request. If the request is of the first type, then at step 710 the sender of the request does not process the response. If the processed response would have generated a corresponding message (for example, confirming that the request is not of the first type), then that message is not generated.

For example, when the original request is an AJAX request, the browser will not load the detector page and thus the JavaScript on it will not be exercised. In one example, the request is an AJAX request generated by JavaScript running in a browser, and the response is a webpage. The webpage is not recognized by the JavaScript that generated the AJAX request (since it expected a response of a different form), and the AJAX request process terminates. Thus, the CASB portal will not issue a SAML request towards the IDP and AJAX requests will not flood the IDP. The CASB portal may experience the AJAX request load from the Gateway (until the user logs into the SaaS service in the foreground).

If the request is of the second type, then at step 712 the response is processed by the sender. In one example, the request is a SAML request, and the response is a webpage that when loaded executes JavaScript that generates and sends a message that confirms that the request is not of the first type (e.g., not an AJAX request).

For example, when the request is not an AJAX request (i.e., when the request is of the second type and not the first type), the computer's browser (e.g., Browser 140) may load the detector page and exercise the JavaScript on it. That JavaScript may POST back to app.elastica.net/saml2/ajax_detector/
?<original_url_params>&is_ajax_request=false. The handler for this /saml2/ajax_detector/ then may issue a redirection to /saml2/login_initiator/ with all the URL parameters intact because it sees the is_ajax_request as FALSE. These specific messages and terms are, of course, only examples, and any suitable messages may be used.

At step 714, the confirmation message may be received (e.g., by a server in a SAML-SSO-IPD system such as is depicted in FIG. 1), and further process-related communications with the sender of the request may occur. In one example, the process is a SAML-SSO process, and the sender is a computer/browser that at step 720 is redirected to an IPD for identity verification.

Embodiments described herein include computer systems and computer-implemented methods for server load control. An example method embodiment may be implemented by a first computing device (e.g., a server), and may include (a) receiving from a second computing device (e.g., a user computer), via a computer network, a request of a first type or a second type; (b) transmitting to the user computer a response of a form that will not be processed by the user computer when the request is of the first type, and that will be processed by the user computer when the request is of the second type; and (c) when the request is of the second type and the response is processed by the user computer, receiving a message that results from the processed response and indicates that the request is not of the first type. As explained above, benefits of the above-described embodiments include reduced loads on servers (e.g., IDP servers) that would be burdened by repeated requests of the first type (i.e., that cannot be completed), as well as related reduced loads on any other network components that would be required to process such requests.

Figure 8:
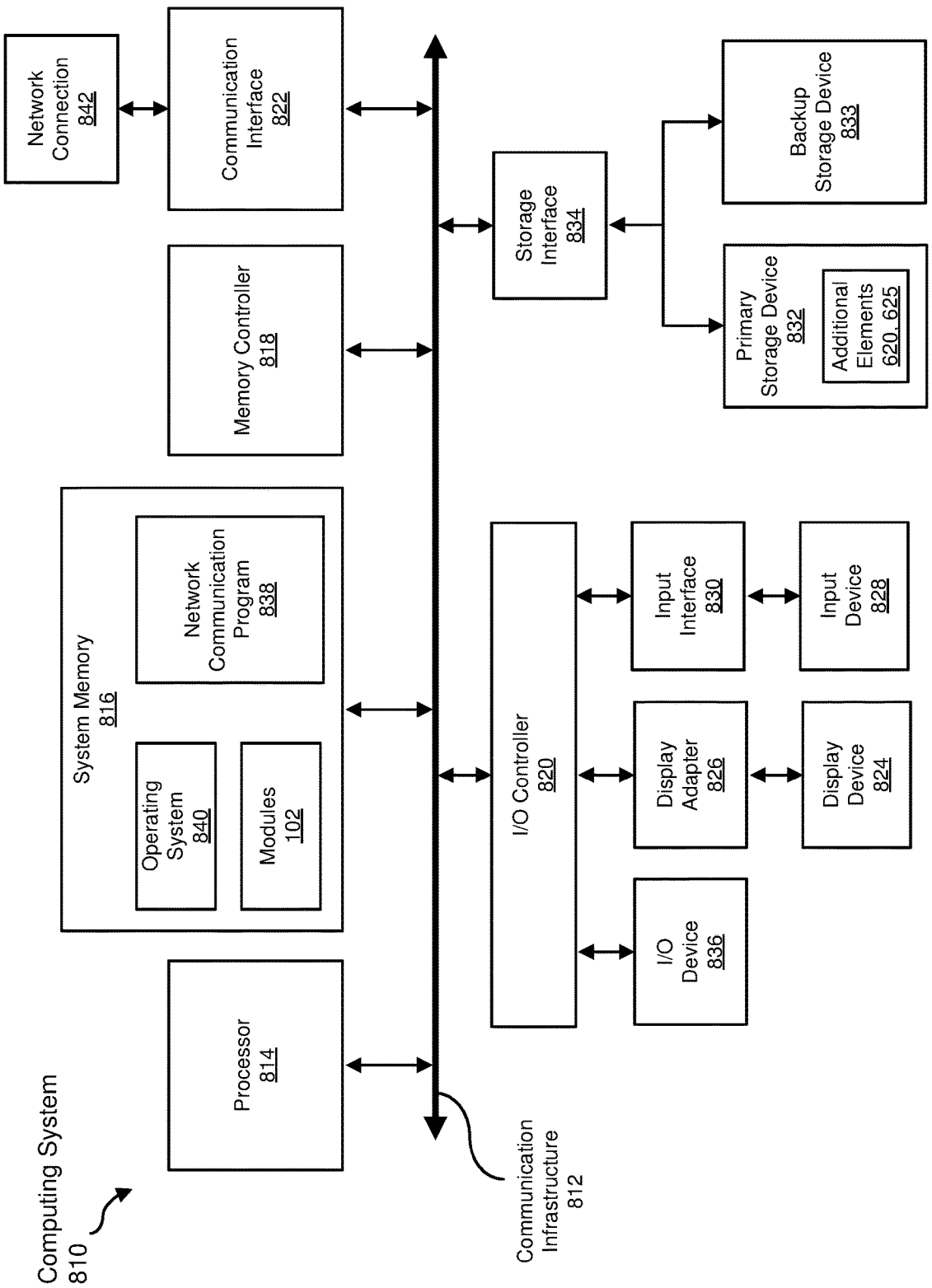
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein. All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below).

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
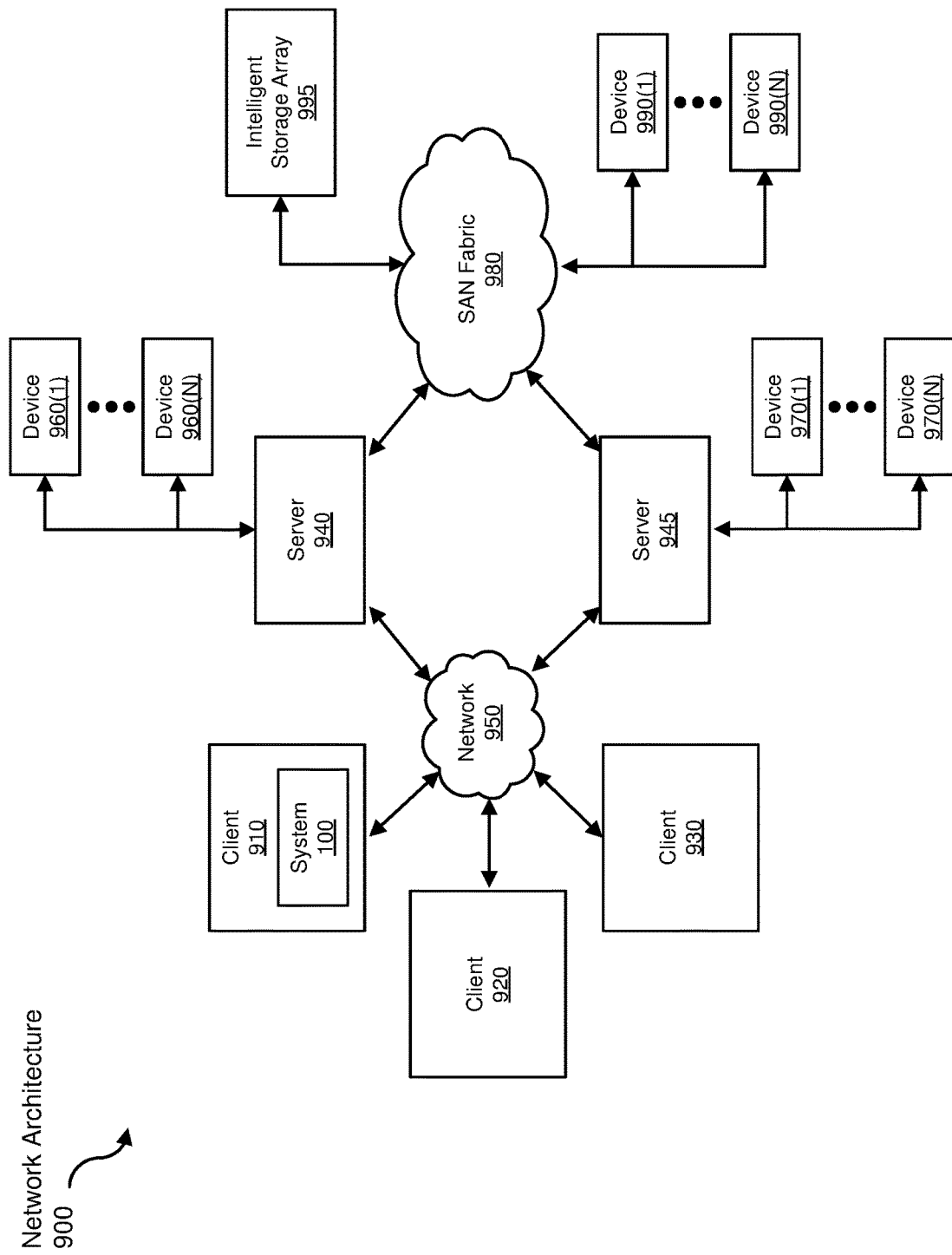
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein. All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for server load control.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as an illustrative example since many other architectures can be implemented to achieve the same functionality. For example, all specific websites, URLs, computer code and commands, protocols, etc., are described herein only to provide concrete examples to aid the understanding of the reader, and are not intended, and should not be interpreted, to limit the scope of any embodiments or claims.

In some examples, all or a portion of components (computers and servers), networks, and systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of components (computers and servers), networks, and systems described herein may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of components (computers and servers), networks, and systems described herein may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

According to various embodiments, all or a portion of components (computers and servers), networks, and systems described herein may be part of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of components (computers and servers), networks, and systems described herein may be part of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of components (computers and servers), networks, and systems described herein may be part of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of components (computers and servers), networks, and systems described herein may be part of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequences of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for server load control, performed by a first computing device comprising at least one processor, the method comprising:
    receiving from a second computing device comprising at least one processor, via a computer network, a request of at least one of a first type or a second type;
    transmitting, to the second computing device via the computer network, a response to the request, wherein the response is of a form that will not be processed by the second computing device when the request is of the first type, and that will be processed by the second computing device when the request is of the second type; and
    when the request is of the second type and the response is processed by the second computing device, receiving a message from the second computing device, via the computer network, wherein the message results from the processed response and indicates that the request is not of the first type.

2. The computer-implemented method of claim 1, wherein the first type of request is an AJAX request, and the second type of request is a non-AJAX request.

3. The computer-implemented method of claim 1, further comprising, after receiving the message, redirecting a browser running on the second computing device to an identity provider server.

4. The computer-implemented method of claim 1, wherein the response comprises a web page to be loaded by a browser running on the second computing device when the request is of the second type, and that will not be loaded by the browser when the request is of the first type.

5. The computer-implemented method of claim 4, wherein when the web page is loaded by the browser of the second computing device, the loaded web page runs JavaScript that sends the message.

6. The computer-implemented method of claim 1, wherein the message comprises data from the request.

7. The computer-implemented method of claim 1, wherein the first type of request is an asynchronous request, and the second type of request is a synchronous request.

8. The computer-implemented method of claim 1, wherein the first computing device is a cloud access security broker server.

9. The computer-implemented method of claim 1, wherein the first computing device is a server within a Security Assertion Markup Language identity verification system.

10. A first computing device comprising a communication module, stored in memory, and at least one physical processor, wherein the communication module:
  receives from a second computing device, via a computer network, a request of at least one of a first type or a second type;
  transmits, to the second computing device via the computer network, a response to the request that is of a form that will not be processed by the second computing device when the request is of the first type, and that will be processed by the second computing device when the request is of the second type; and
  when the request is of the second type and the response is processed by the second computing device, receives a message from the second computing device, via the computer network, wherein the message results from the processed response and indicates that the request is not of the first type.

11. The first computing device of claim 10, wherein the first type of request is an AJAX request, and the second type of request is a non-AJAX request.

12. The first computing device of claim 10, wherein after receiving the message the communication module redirects a browser running on the second computing device to an identity provider server.

13. The first computing device of claim 10, wherein the response comprises a web page that will be loaded by a browser running on the second computing device when the request is of the second type, and that will not be loaded by the browser when the request is of the first type.

14. The first computing device of claim 13, wherein when the web page is loaded by the browser of the second computing device, the loaded web page runs JavaScript that sends the message to the communication module.

15. The first computing device of claim 10, wherein the first type of request is an asynchronous request, and the second type of request is a synchronous request.

16. The first computing device of claim 10, wherein the first computing device is a cloud access security broker server.

17. The first computing device of claim 10, wherein the first computing device is a server within a Security Assertion Markup Language identity verification system.

18. The first computing device of claim 13, further comprising a server module that generates the web page and JavaScript.

19. A non-transitory computer-readable medium comprising one or more computer-executable instructions that, when executed by at least one processor of a first computing device, cause the first computing device to:
  receive from a second computing device comprising at least one processor, via a computer network, a request of at least one of a first type or a second type;
  transmit, to the second computing device via the computer network, a response to the request, wherein the response is of a form that will not be processed by the second computing device when the request is of the first type, and that will be processed by the second computing device when the request is of the second type; and
  when the request is of the second type and the response is processed by the second computing device, receive a message from the second computing device, via the computer network, wherein the message results from the processed response and indicates that the request is not of the first type.

* * * * *